(12) United States Patent
Diorio

(10) Patent No.: US 9,607,286 B1
(45) Date of Patent: Mar. 28, 2017

(54) RFID TAGS WITH BRAND PROTECTION AND LOSS PREVENTION

(71) Applicant: Impinj, Inc., Seattle, WA (US)

(72) Inventor: Christopher J. Diorio, Shoreline, WA (US)

(73) Assignee: Impinj, Inc., Seattle, WA (US)

(*) Notice: Subject to any disclaimer, the term of this patent is extended or adjusted under 35 U.S.C. 154(b) by 0 days.

(21) Appl. No.: 14/997,602

(22) Filed: Jan. 18, 2016

Related U.S. Application Data

(60) Provisional application No. 62/105,564, filed on Jan. 20, 2015.

(51) Int. Cl.
  G06Q 30/00 (2012.01)
  G06Q 10/08 (2012.01)
  G06K 19/077 (2006.01)

(52) U.S. Cl.
  CPC ..... G06Q 10/087 (2013.01); G06K 19/07758 (2013.01)

(58) Field of Classification Search
  CPC .............. G06Q 10/087; G06K 19/07758
  USPC .................................. 235/385, 492
  See application file for complete search history.

(56) References Cited

U.S. PATENT DOCUMENTS

| | | | |
|---|---|---|---|
| 6,426,707 B1* | 7/2002 | Prieto ............ | G07B 11/00 235/384 |
| 7,012,528 B2* | 3/2006 | Mathewson, II .... | G06Q 20/203 235/375 |
| 7,240,824 B2* | 7/2007 | Stockton .......... | G06Q 20/387 235/375 |
| 8,094,026 B1* | 1/2012 | Green ............ | G08B 13/19697 235/375 |
| 8,847,761 B1* | 9/2014 | Claudatos ........ | G06Q 10/087 235/375 |
| 2004/0143505 A1* | 7/2004 | Kovach ........... | G06Q 10/087 705/23 |
| 2004/0148226 A1* | 7/2004 | Shanahan ......... | G06Q 30/0241 705/14.73 |
| 2005/0040950 A1* | 2/2005 | Clucas ........... | G08B 13/2448 340/572.1 |
| 2005/0073416 A1* | 4/2005 | Mathewson, II .... | G06Q 20/202 340/572.1 |
| 2005/0086128 A1* | 4/2005 | Shanahan ......... | G06Q 30/0241 705/26.61 |
| 2006/0004635 A1* | 1/2006 | Siefke ........... | G06Q 10/02 705/22 |
| 2008/0126210 A1* | 5/2008 | Shanahan ......... | G06Q 30/0241 705/14.69 |

(Continued)

Primary Examiner — Paultep Savusdiphol
(74) Attorney, Agent, or Firm — Turk IP Law, LLC

(57) ABSTRACT

Brand-protection codes may be used to maintain authenticity chains for items or tags across a number of different entities. A first entity, such as a tag or item manufacturer, may generate a first brand-protection code (BPC) based on a first key and a tag or item identifier and store the first BPC on a tag associated with an item. A second entity that receives the tag and/or item may attempt to authenticate the first BPC. If the second entity authenticates the first BPC, the second entity may generate an authentication code based on a second key and the first BPC and/or the tag/item identifier, and may write the authentication code to the tag. In some embodiments, the authentication code may be a second brand-protection code, or an exit code that allows the item to exit a facility such as a retail store.

20 Claims, 10 Drawing Sheets

(56) References Cited

U.S. PATENT DOCUMENTS

| | | | | |
|---|---|---|---|---|
| 2009/0055278 A1* | 2/2009 | Nemani | ............... | G06Q 20/204 |
| | | | | 705/17 |
| 2010/0019905 A1* | 1/2010 | Boddie | ............... | G08B 13/248 |
| | | | | 340/572.1 |
| 2010/0171616 A1* | 7/2010 | Walliser | ................. | G06Q 10/08 |
| | | | | 340/572.1 |
| 2011/0131084 A1* | 6/2011 | Shanahan | .......... | G06Q 30/0241 |
| | | | | 705/14.4 |
| 2012/0200389 A1* | 8/2012 | Solomon | ............. | G06Q 10/087 |
| | | | | 340/5.52 |
| 2013/0201000 A1* | 8/2013 | Solomon | ................. | G05B 1/01 |
| | | | | 340/5.83 |
| 2013/0320079 A1* | 12/2013 | Nordin | .................... | G06K 5/00 |
| | | | | 235/375 |
| 2013/0339221 A1* | 12/2013 | Gentelet | ............. | G06K 7/0008 |
| | | | | 705/39 |
| 2014/0033289 A1* | 1/2014 | Solomon | ................. | G05B 1/01 |
| | | | | 726/7 |
| 2014/0249963 A1* | 9/2014 | Shanahan | .......... | G06Q 30/0241 |
| | | | | 705/26.62 |

* cited by examiner

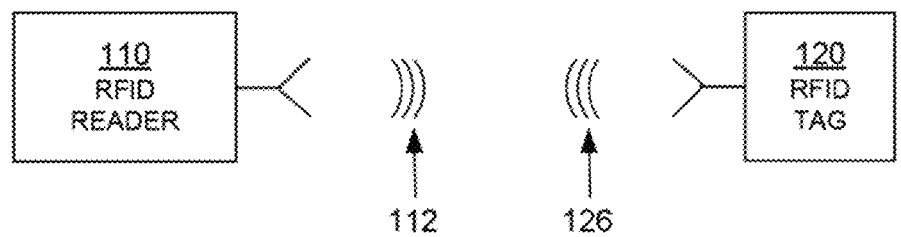
FIG. 1
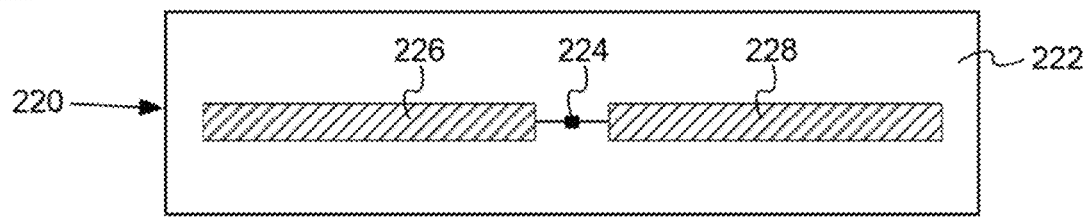
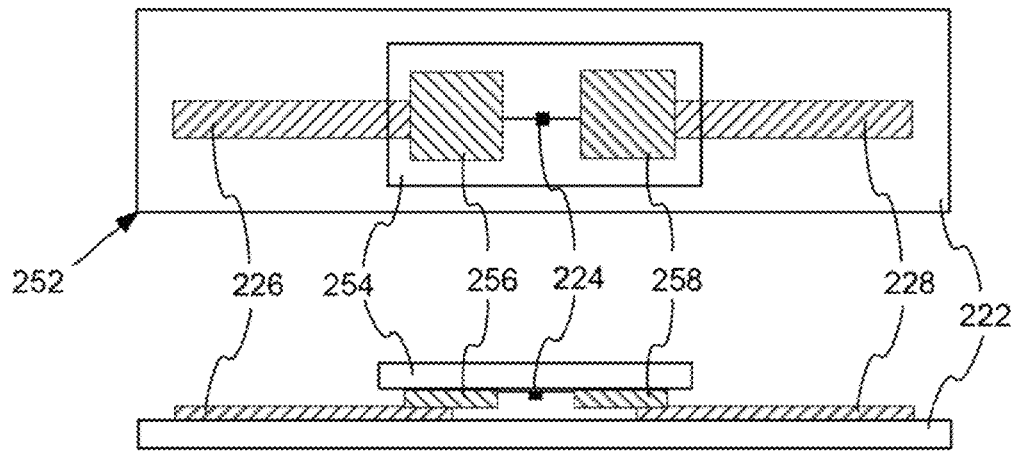
FIG. 2

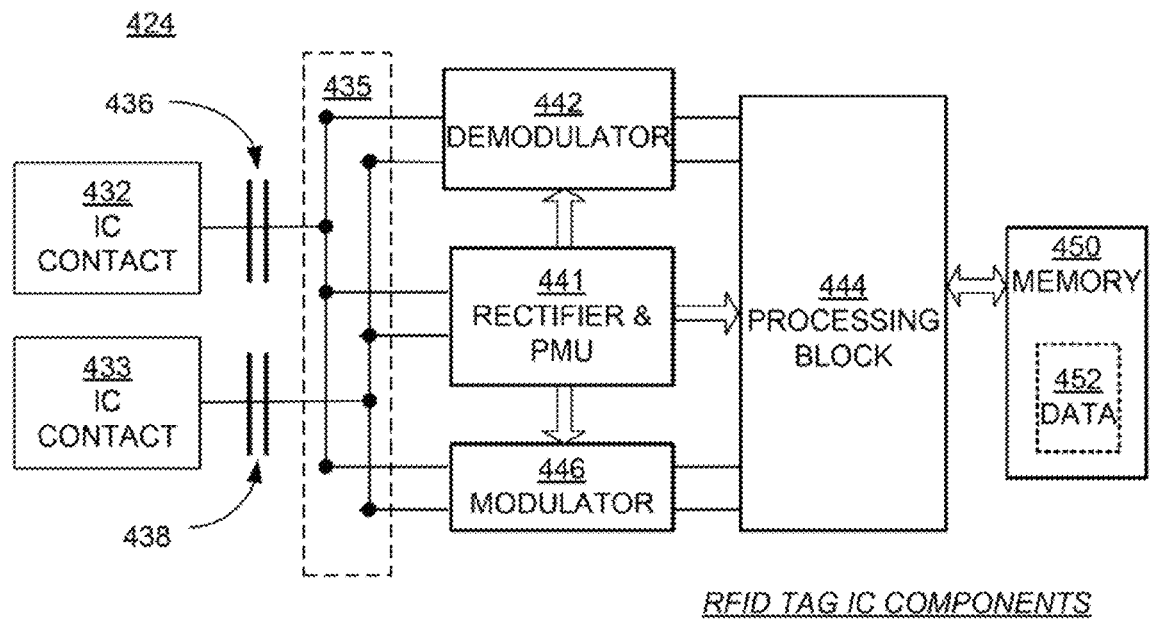
FIG. 4
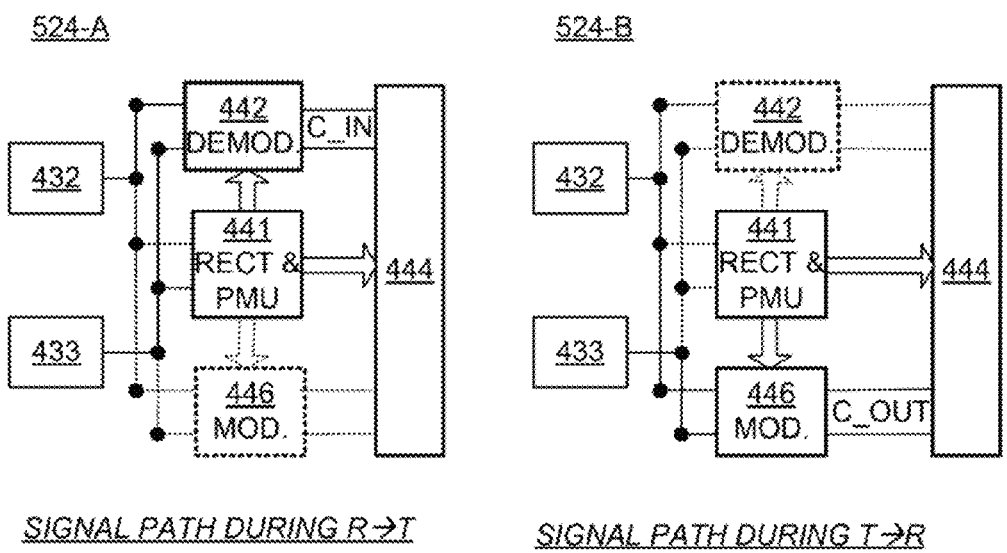
FIG. 5A   FIG. 5B

RFID TAGS WITH BRAND PROTECTION AND LOSS PREVENTION

CROSS REFERENCE TO RELATED APPLICATIONS

This application claims the benefit of U.S. Provisional Patent Application Ser. No. 62/105,564 filed on Jan. 20, 2015. The disclosures of the above application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

Counterfeiting is a problem in many areas of global commerce. For example, retail-goods manufacturers, such as manufacturers of luxury clothing or purses, often find counterfeit items in the marketplace. Many commercial enterprises envision using cryptographically secure RFID systems to ascertain whether a tagged item, or more particularly the tag attached to an item, is genuine and not counterfeit.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to maintaining authenticity chains for items or tags across different entities. A first entity, such as a tag or item manufacturer, may generate a first brand-protection code (BPC) based on a first key and a tag or item identifier and store the first BPC on a tag associated with an item. A second entity that receives the tag and/or item may attempt to authenticate the first BPC. If the second entity authenticates the first BPC, the second entity may generate an authentication code based on a second key and the first BPC and/or the tag/item identifier, and may write the authentication code to the tag. In some embodiments, the authentication code may be a second brand-protection code, or an exit code that allows the item to exit a facility such as a retail store.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 3:
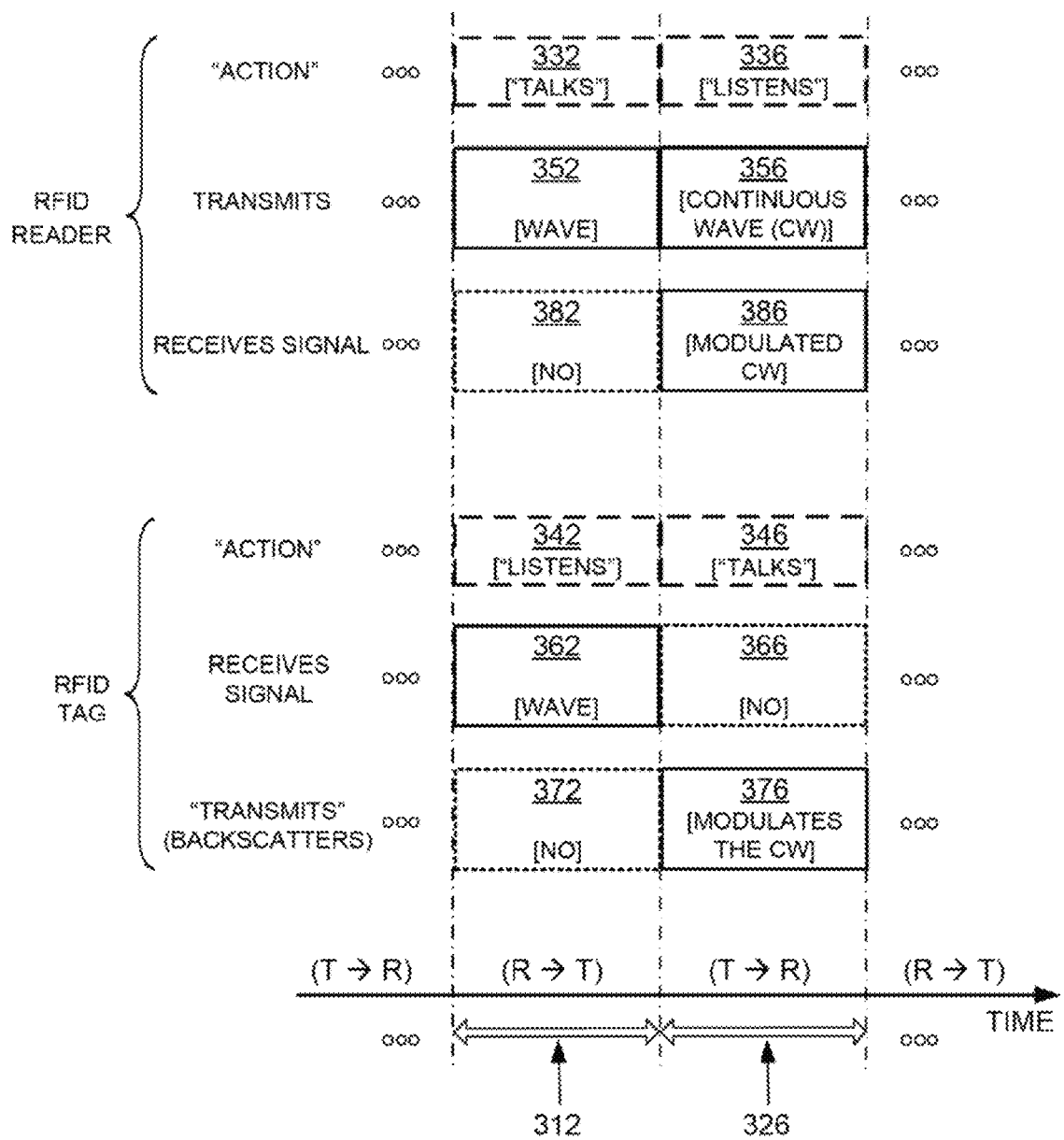
FIG. 3 is a conceptual diagram for explaining a half-duplex mode of communication between the components of the RFID system of FIG. 1.

In the following detailed description, references are made to the accompanying drawings that form a part hereof and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GSI EPCglobal, Inc. ("Gen2 Specification"), versions 1.2.0 and 2.0 of which are hereby incorporated by reference.

In some applications, RFID solutions may use RFID tags attached to items for brand protection and electronic article surveillance (also known as loss prevention). Such solutions should solve a number of challenges. First, a solution should be able to authenticate items at any point in an item's supply chain, by using tags that are difficult to counterfeit yet at the same time be easily authenticated. Second, a solution should be able to quickly discriminate authorized items (e.g., those properly sold) from unauthorized items, preferably within milliseconds. Third, a solution should allow theft prevention without per-tag passwords, which would require an entity such as a retailer to manage multiple tag passwords or keys. Fourth, a solution should allow seamless product returns, where a consumer can seamlessly return an item and a retailer can quickly authenticate the authenticity (i.e., authenticate) and authorization status of the item. Fifth, a solution should allow discrimination between tags associated with different entities (e.g., retailers), ignoring tags from other entities while reliably detecting relevant tags and providing alarms and notifications if necessary. Sixth, a solution should minimize false alarms while allowing seamless product returns without storing consumer information on a tag. Seventh, a solution should not interfere with other uses of a tag.

In some embodiments, brand protection and loss prevention applications may rely on a tag or item authenticity chain, based on a number of identification or authentication codes stored on an RFID tag associated with an item. Initial tag or item authentication may involve a first brand-protection code (BPC) stored on a tag by a tag or item manufacturer. The tag or item manufacturer, having itself manufactured the tag or item, knows that the tag or item is authentic, and generates and stores the first BPC on the tag. The first BPC may be generated to allow other entities to authenticate (i.e., verify the integrity and authenticity of) the first BPC, for example, based on cryptographic techniques as described below, and may serve as a first link in the authenticity chain of the tag or item.

A retailer or facility owner, upon receiving the tagged item, may authenticate the first BPC, for example by using a manufacturer secret or public key. Upon authentication of the first BPC, the retailer or facility owner may subsequently generate and store an authentication code on the tag, optionally overwriting the first BPC (e.g., to reduce memory usage). For example, the authentication code may be a second BPC, or may be an exit code (e.g., a sold code) that authorizes the tag to exit a store or facility. The authentication code, similar to the first BPC, may be generated to allow other entities to authenticate it, and may be based on a tag or item identifier and/or the first BPC. The authentication code serves as a second link in the authenticity chain of the tag or item, and attests to the authenticity of the previous link (the first BPC). Another entity that successfully authenticates the second link (the authentication code) can then be assured that previous links are also authentic, because the retailer or facility owner only writes the second link upon authentication of the previous (first) link of the authenticity chain, represented by the first BPC. Of course, tag/item authenticity chains may include more than two links, and authentication of any link in a properly-generated authenticity chain implicitly authenticates all preceding links.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG.

2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-muting busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R-T session, it need not be so. For example, during a R-9T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
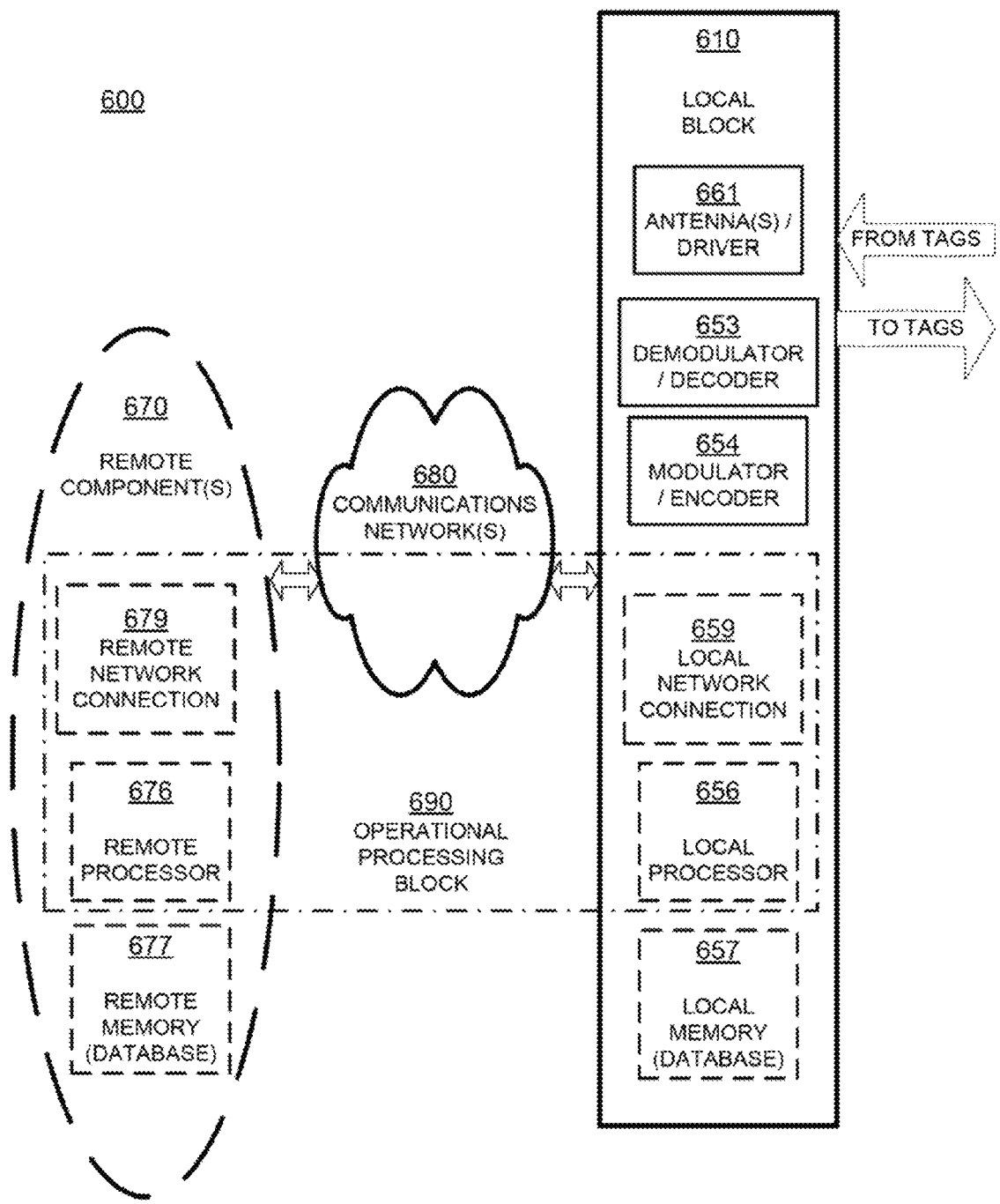
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with the tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer, programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, secret keys, key pairs, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They can access each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an authentication function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

Of the above-described elements, it may be useful to consider a combination of these components, designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
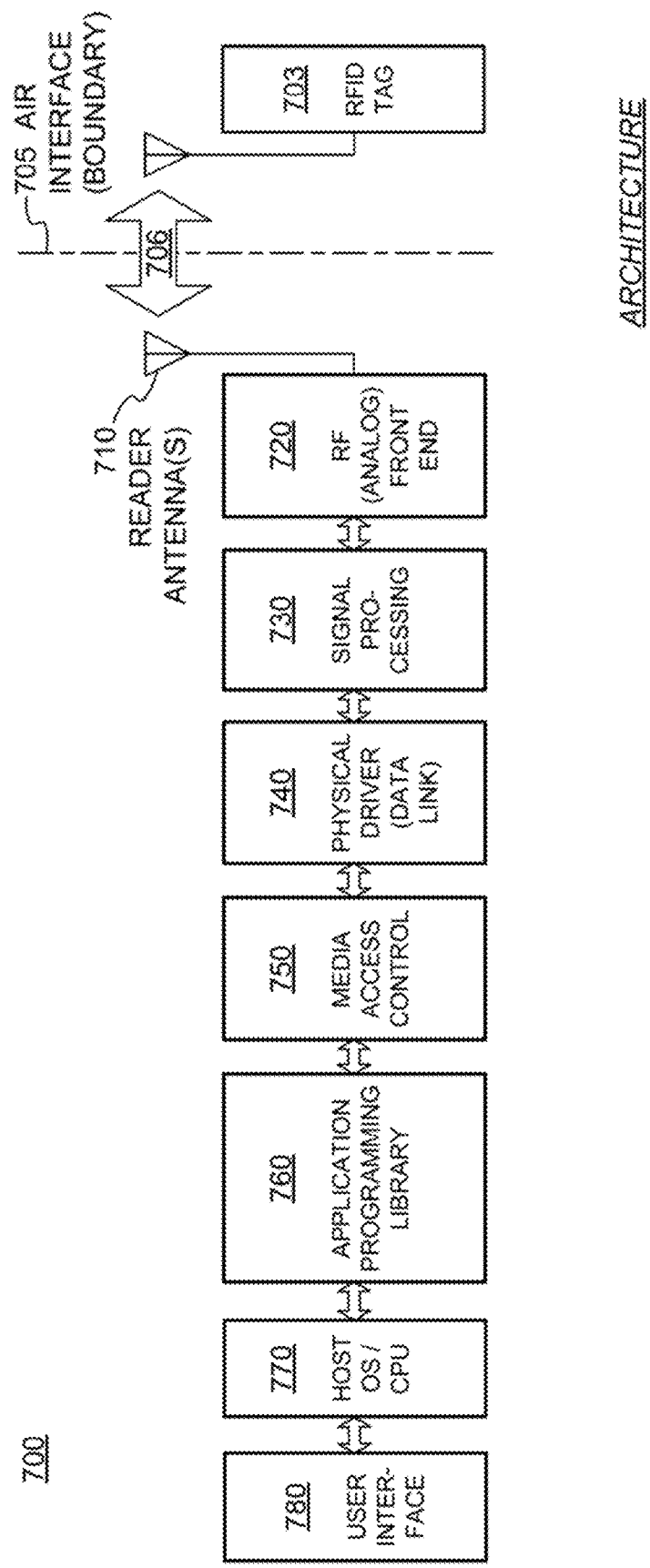
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may authenticate an electronic signature, create a tag challenge, and/or authenticate a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to maintaining authenticity chains of items or tags across different entities. Embodiments additionally include programs, and methods of operation of the programs. A program is generally defined as a group of steps or operations leading to a desired result, due to the nature of the elements in the steps and their sequence. A program may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 8:
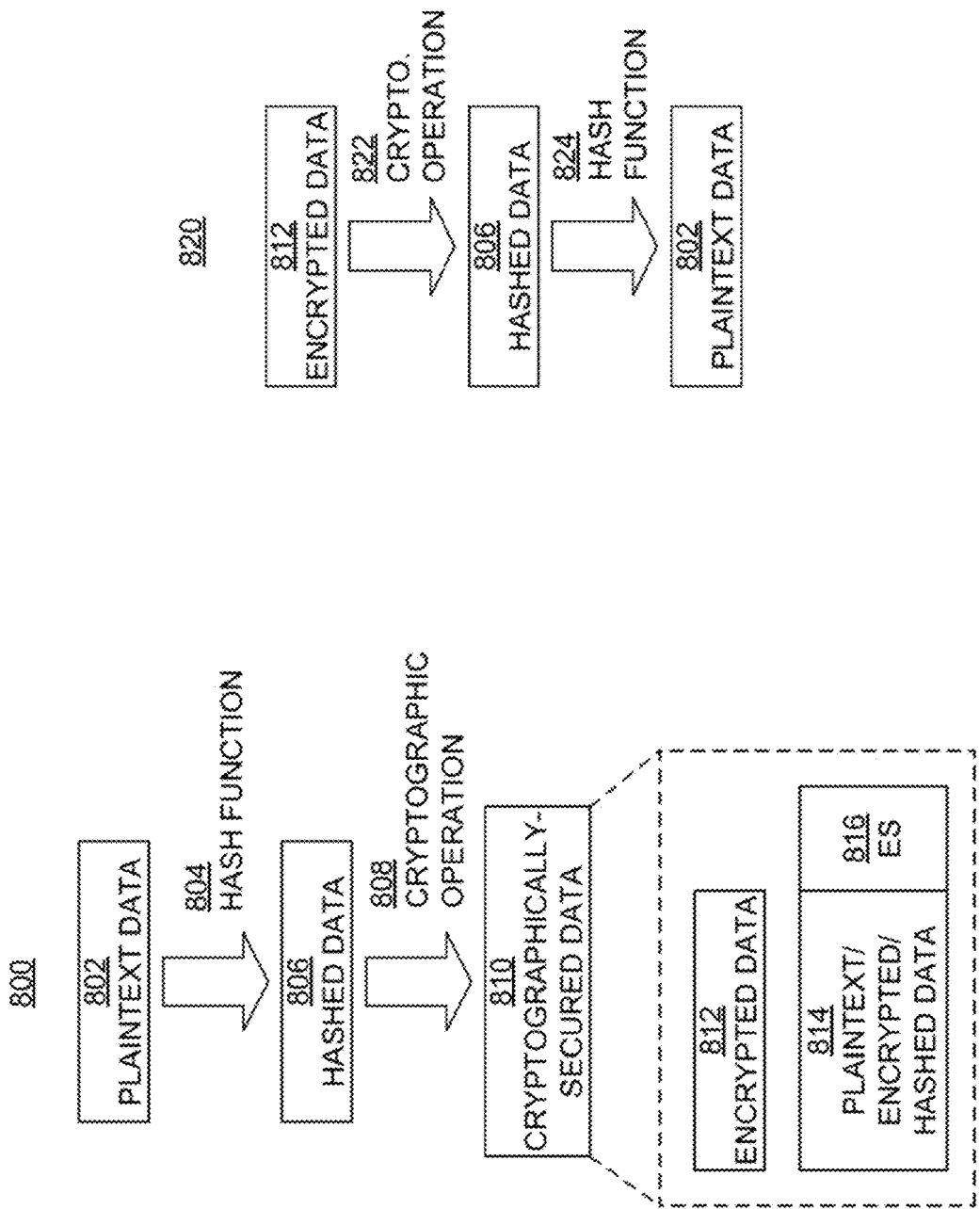
FIG. 8A is a flow diagram illustrating the generation of cryptographically-secured data.
FIG. 8B is a flow diagram illustrating data recovery from encrypted or hashed data.

FIG. 8A is a flow diagram 800 illustrating the generation of cryptographically-secured data, such as brand-protection codes, owner codes, and/or authentication/exit codes. Flow diagram 800 begins with plaintext data 802, which is the data to be cryptographically secured. In some embodiments, a hash function 804 may first be used to generate a hashed data value 806. A cryptographic operation 808 may then be used to generate cryptographically-secured data 810 from plaintext data 802 and/or hashed data 806. The cryptographic operation 808 may implement any combination of suitable cryptographic techniques or algorithms, such as symmetric key algorithms (e.g., Data Encryption Standard, DES or Advanced Encryption Standard, AES), asymmetric key algorithms (e.g., Rivest-Shamir-Adleman or RSA), stream ciphers, block ciphers, or any other suitable algorithm. When symmetric key algorithms are used, cryptographically-secured data 810 may be generated using a secret key known to both the sender of plaintext data 802 and the intended recipient of cryptographically-secured data 810. When asymmetric key algorithms are used, cryptographically-secured data 810 may be generated using a private key known to the sender of plaintext data 802 but not the intended recipient of cryptographically-secured data 810.

Cryptographically-secured data 810 may be cryptographically secured in any number of ways. In some embodiments, cryptographically-secured data 810 includes encrypted data 812, formed by encrypting plaintext data 802 and/or hashed data 806 using cryptographic operation 808. In other embodiments, cryptographically-secured data 810 includes data 814 and an electronic signature (ES) 816 associated with data 814 and used to allow a recipient to authenticate data 814. Data 814 may be plaintext (e.g., plaintext data 802), hashed (e.g., hashed data 806) or encrypted (e.g., encrypted data 812). If hashed or encrypted, data 814 may be processed to recover plaintext data 802 as described below.

FIG. 8B is a flow diagram 820 illustrating data recovery from encrypted or hashed data. Flow diagram 820 may be performed by a recipient of cryptographically-secured data 810, where cryptographically-secured data 810 includes hashed data 806 or encrypted data 812. If the latter, the recipient may use a cryptographic operation 822 to generate hashed data 806. Cryptographic operation 822 may be the reverse of cryptographic operation 808, and like cryptographic operation 808 may implement any combination of suitable cryptographic techniques or algorithms. If cryptographic operation 822 uses symmetric key algorithms, the recipient may use a known secret key to decrypt the encrypted data 812, whereas if cryptographic operation 822 uses asymmetric key algorithms, the recipient may use a known public key corresponding to the sender's private key to decrypt the encrypted data 812.

Subsequently, or if cryptographically-secured data 810 includes hashed data 806, the recipient may use a hash function 824 to recover plaintext data 802 from hashed data 806. Hash function 824 may be the same as hash function 804 or the reverse of hash function 804, and the recipient may determine the appropriate hash function 824 to use based on a communication from the sender and/or a priori knowledge.

As described above, cryptographically-secured data 810 may include an electronic signature (ES) 816 that allows a recipient to authenticate data 814. Electronic signatures are cryptographic structures used to authenticate that a particular, signed message originated from a particular source and has not been altered. The sender of a signed message generates an electronic signature based on a sender key and the original message and "signs" the message by attaching the signature. A message recipient can then cryptographically process the attached signature to determine whether it corresponds to the received message. If so the message may be presumed authentic, and if not the message may be presumed counterfeit. Electronic signature 816, if authenticated by a recipient of data 814 provides assurance that data 814 originated from a particular source and was not altered en route to the recipient.

Electronic signatures may be generated using symmetric and asymmetric cryptographic techniques. An electronic signature generated using symmetric cryptography may be known as a "message authentication code" (MAC). To generate a MAC for a message, a signatory (also referred to as a sender) uses a secret key and the message to generate the MAC. The sender may then send the message and the associated MAC to a recipient. The recipient in turn can use the same secret key to authenticate that the MAC corresponds to the message and that the sender knows the secret key. In some embodiments, the sender may instead only send the MAC to the recipient, and the recipient may recover the associated message from the MAC using the secret key.

An electronic signature generated using asymmetric cryptography may be known as a "digital signature" (DS). To generate a DS for a message, a signatory or sender uses the message and the private key from a private/public key pair to generate the DS. The private key and public key in the key pair are mathematically related to each other, and the signatory keeps the private key secret while making the public key available to others. The sender may then send both the message and the associated DS (referred to as a "digital signature with appendix") to a recipient. The recipient can then in turn use the public key to authenticate that the DS corresponds to the message and that the sender possesses the private key. An authenticated MAC or DS gives the recipient reason to believe that the message was created by a known sender, and that it was not altered in transit. In some embodiments, digital signatures may be generated without using a separate hash, using a digital signature scheme with message recovery. In such embodiments, a DS may be generated directly from the data, and only the DS sent to the recipient. During authentication, the recipient directly decrypts the DS with the public key to recover the data. Of course, other digital or electronic signature schemes may be used.

An important attribute of digital signatures is that they are difficult to forge or clone. A number of standards have been developed for digital signatures. The Digital Signature Standard (DSS) is a U.S. Government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, Secure Hash Standard (SHS), specifies the hash functions to be used in conjunction with FIPS 186-1 and FIPS 186-3.

In this disclosure, the term "electronic signature" or "ES" may refer to a MAC generated using symmetric cryptography or to a DS generated using asymmetric cryptography.

Figure 9:
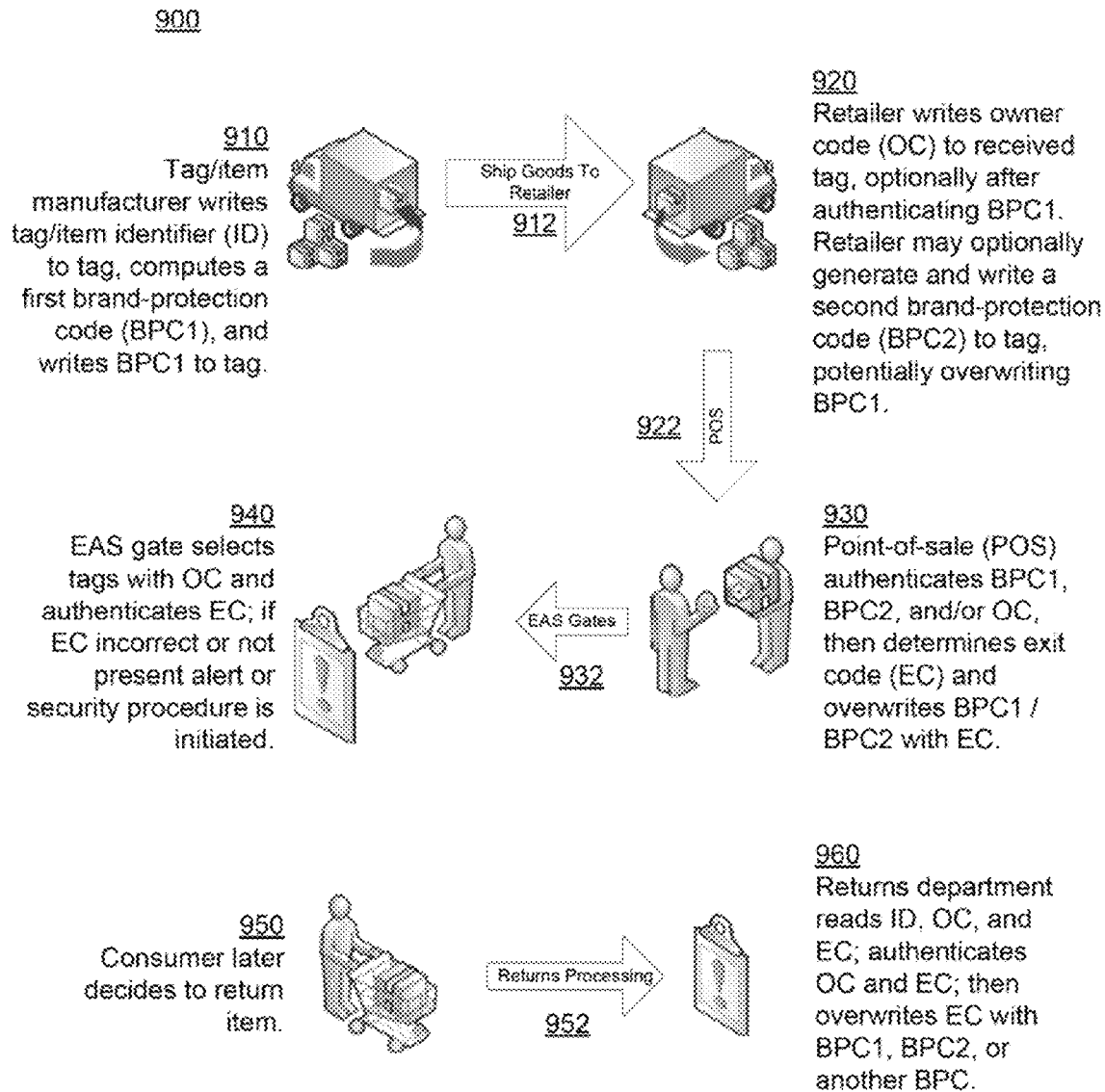
FIG. 9 depicts how an item authenticity chain may be maintained during checkout and return processes, according to embodiments.

As described above, authenticity chains allow an entity to authenticate an item or tag. FIG. 9 depicts how an item authenticity chain may be maintained during checkout and return processes, according to embodiments. In diagram 900, a tag or item manufacturer may write a tag or item identifier (ID) to an RFID tag associated with an item at step 910. The ID identifies the tag and/or the item to which the tag is attached, and may be a tag identifier (TID), an item identifier (II), an electronic product code (EPC), a trade identification number such as a global trade item number (GTIN) or serialized GTIN (SGTIN), or any other identifier for the tag and/or item. Also in step 910, the manufacturer may generate a first brand-protection code BPC1 based on the ID and write BPC1 to the tag to serve as a first link in an authenticity chain associated with the tag and/or tagged item. In some embodiments, BPC1 may be generated using one or more of the cryptographic techniques described above. For example, the manufacturer may possess a manufacturer secret or private key, and may use the key to generate an electronic signature based on the ID and optionally other suitable information (e.g., a manufacturer identifier, a timestamp, a location identifier, etc.) to use as BPC1. The manufacturer may then ship the tagged item to a retailer in step 912.

At step 920, the retailer, having received the tagged item shipped in step 912, may write an owner code (OC) to the tag. The OC identifies an owner associated with the tag or item, and allows discrimination between tags or items associated with different entities. For example, the OC may identify the retailer receiving the tagged item. In some embodiments, the retailer may attempt to authenticate BPC1 before writing the OC, in order to ensure that the received tagged item is authentic. For example, the retailer may have access to the manufacturer secret key used to generate BPC1, and may use the manufacturer secret key to authenticate BPC1. As another example, the retailer may know the manufacturer public key corresponding to the private key used to generate BPC1, and may use the manufacturer public key to authenticate BPC1. In some embodiments, the retailer may write the OC without authenticating BPC1, or may write the OC even if BPC1 cannot be authenticated.

In some embodiments, at step 920 the retailer may determine and write a second BPC (BPC2) to the tag, similar to BPC1. For example, the retailer may possess a retailer secret or private key, and may use the key to generate an electronic signature based on the ID (e.g., a tag identifier and/or an item identifier), BPC1, and/or any other suitable information (e.g., retailer identifier, a timestamp, a location identifier, etc.). In some embodiments, the retailer may instead select and retrieve an appropriate BPC2 from a set of stored BPCs, such as a database of BPCs. The retailer may then write BPC2 to the tag, alongside or overwriting all of or a portion of BPC1. For example, BPC2 may be shorter than BPC11, and the retailer may select a portion of BPC1 corresponding to the length of BPC2 and overwrite the selected BPC portion with BPC2. As another example, the retailer may select a portion of BPC2 having a particular length, select a portion of BPC1 having the same length, and overwrite the selected BPC1 portion with the selection BPC2 portion. As yet another example, the retailer may overwrite non-contiguous portions of BPC1 with portions of BPC1. In some embodiments, the retailer may overwrite BPC1 with BPC2 only after authenticating BPC1. In this case, BPC2 may serve as a second link in the authenticity chain of the tag/item, and overwriting the previous BPC (BPC1) with BPC2 may reduce memory usage as compared to storing multiple BPCs.

At step 922, the tagged item may transition to a point-of-sale (POS), such as a stationary register or a mobile checkout device. For example, after step 920 the tagged item may be placed within a retail store or facility, and a customer may pick up the tagged item and decide to purchase it at the POS. At step 930, if the tagged item is to be purchased, the POS may determine whether the tagged item belongs to the retailer by reading the OC from the tag, and may also authenticate the brand-protection code stored on the tag (BPC1 or BPC2), for example using a secret or public key associated with the tag/item manufacturer or the retailer. Upon determining that the tagged item belongs to the retailer and authenticating BPC1 or BPC2, the POS may determine an exit code (EC) that indicates that the tagged item has been sold. In some embodiments, the EC may be an electronic signature generated based on a retailer secret or private key, the ID (e.g., a tag identifier or an item identifier), BPC1, BPC2, the OC, and/or any other suitable information (e.g., POS identifier, transaction timestamp, etc.). In some embodiments, the EC may additionally or instead be generated as described in U.S. Pat. No. 8,593,257 filed on Sep. 25, 2010, U.S. Pat. No. 8,866,595 filed on Aug. 16, 2013, U.S. Pat. No. 8,872,636 filed on Aug. 16, 2013, U.S. Pat. No. 8,866,596 filed on Aug. 21, 2013, U.S. Pat. No. 9,189,904 filed on Jan. 24, 2014, and U.S. patent application Ser. No. 14/879,161 filed on Oct. 9, 2015, each of which are hereby incorporated by reference in their entireties. For example, the EC may be generated based on a ticket, a value selected from a scratchlist, an abridged code, or any other suitable method.

After the purchase has been authorized and the EC has been determined, the POS may write the EC to the tag to indicate that the item associated with the tag has been properly purchased or sold and is approved to exit the store. In some embodiments, the POS may overwrite all of a portion of the already-present BPC1/BPC2 with the EC, similar to how the retailer may overwrite all or a portion of BPC1 with BPC2. In this case, the EC may serve as a second link (if BPC1 is not present) or a third link (if BPC2 is present) in the authenticity chain of the tag/item.

After the tagged item has been purchased, the customer may exit the store via an electronic article surveillance (EAS) gate at step 932. An EAS gate, often positioned at an exit of a store or facility, attempts to prevent or detect unauthorized exit of tags by finding tags that store the OC (in other words, tags that in step 920 were indicated as being associated with the store) and determining whether the tags have authentic ECs that indicate that their associated items have been properly sold and are approved to exit the store. If a tag that stores the OC does not have an authentic EC, then the EAS gate determines that the tag is not authorized to exit, and may initiate an alert or security procedure. Alert and security procedures may include sounding an audible or silent alarm, activating a security system, alerting an entity associated with the store, alerting an authority (e.g., security personnel, police personnel, military personnel, a facility supervisor, or any other authorized person), writing an alert code to the tag, sending a message to an entity or authority associated with the store, directing a camera toward the exit, taking a picture or a video from a camera directed toward the exit, and/or securing a physical barrier such as by locking a door or gate or activating an obstruction (e.g., a barrier) associated with the exit.

Accordingly, when the customer with the tagged item attempts to exit the store, the EAS gate may detect the tag storing the OC and associated with the item at step 940. The EAS gate may then determine whether the tag has an authentic EC that indicates that the associated item has been properly sold. In some embodiments, the EAS gate may itself or be coupled to a controller that can authenticate the EC, for example using a cryptographic scheme or any other suitable EC authentication method, such as those described above and incorporated by reference. In other embodiments, the EAS gate may query a database to determine whether the EC is authentic, or rely on some other external entity for authentication of the EC. Upon authenticating the EC, the EAS gate may allow the tagged item to exit. On the other hand, if the EC had been incorrect or not present, the EAS gate may initiate an alert or security procedure, as described above.

In some embodiments, the customer may be able to retrieve the ID(s), the EC, and/or any BPCs present on the tag via, for example, a mobile or external (i.e., not associated with the retailer or store) reader and use the retrieved code for some other purpose. For example, the customer may retrieve the EC and/or BPCs present on the tag, provide the retrieved data to a website or application associated with the retailer and/or manufacturer, and receive a response indicating whether the tagged item is authentic. As another example, the customer may retrieve the EC and/or BPCs present on the tag, provide the retrieved data to a website or application associated with the retailer and/or manufacturer, and receive additional information about the tagged item, such as manufacture location, manufacture date, expiration date, warranty information, ingredients or materials, care instructions, certifications (e.g., made with organic materials, child-free labor, fair trade, etc.), other related products that the customer may be interested in, and/or any other suitable information.

Diagram 900 also depicts an item return process according to embodiments. At step 950, a customer may desire to return a tagged item, such as the tagged item described in steps 910-940, and accordingly may bring the tagged item to the store in step 952. At step 960 the returns department of the store reads the ID, OC, and EC of the tag associated with the item. The returns department may first authenticate the OC to verify that the OC is associated with the store or retailer, to ensure that the item was actually sold by the correct retailer. After authenticating the OC, or in parallel with authenticating the OC, the returns department may then authenticate the EC and correctly associated with the ID. For example, the returns department may cryptographically process the EC to determine whether it is associated with the ID, or the returns department may look up the EC and/or ID in a store database to determine whether the two are associated. Upon authenticating that the EC is authentic and correctly associated with the ID, the returns department may then overwrite the EC with a BPC. The BPC may be a new BPC, generated as described above, or may be one of BPC1 or BPC2 described above. In the latter situation, BPC1 or BPC2 may be re-generated by the returns department as described above, or may be retrieved from a database. Subsequently, the returned item may be re-stocked in the store.

Figure 10:
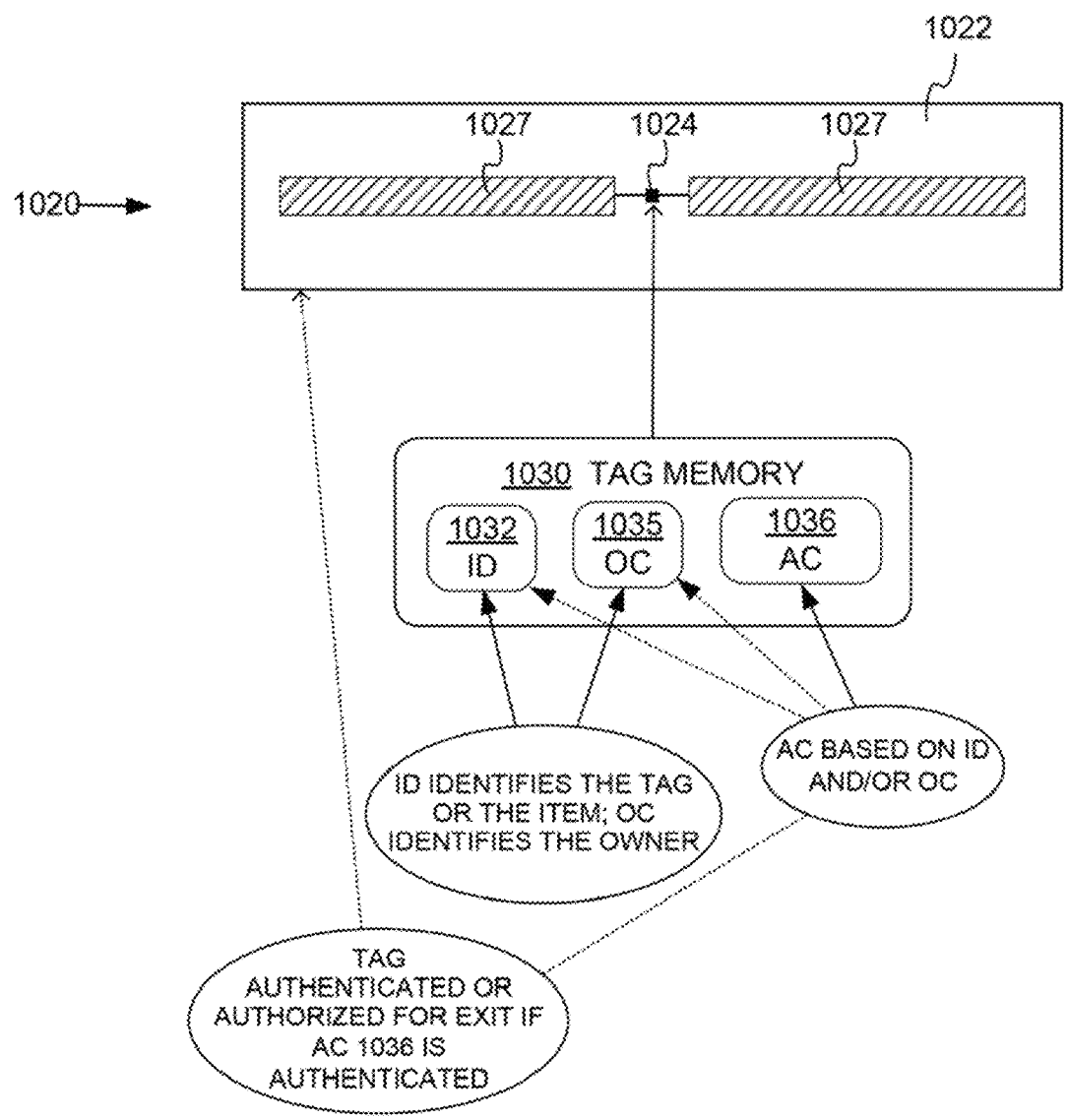
FIG. 10 illustrates an RFID tag configured to store one or more different codes according to embodiments.

FIG. 10 illustrates an RFID tag 1020 configured to store one or more different codes, such as brand-protection, owner, and/or exit codes. RFID tag 1020 includes an IC 1024 and antenna(s) 1027 on inlay 1022. IC 1024 includes a tag memory 1030 configured to store identifiers and codes. In some embodiments, tag memory 1030 may store an identifier (ID) 1032, an owner code (OC) 1035, and one or more other authentication codes (AC) 1036. ID 1032, similar to the ID described above in FIG. 9, identifies the tag and/or the item to which the tag is attached. OC 1035, similar to the OC described above in FIG. 9, identifies an owner associated with the tag or item and allows discrimination between tags or items associated with different entities. In some embodiments, OC 1035 may identify a particular facility (e.g., a retail store) associated with the tag or item. AC 1036 may include one or more brand-protection codes (BPCs) and/or an exit code (EC), and may be generated based on ID 1032, OC 1035, and/or any other suitable code, using an appropriate technique or algorithm. For example, AC 1036 may be generated using one or more of the cryptographic techniques described above. In a system according to embodiments, ID 1032, OC 1035, and AC 1036 may be stored in the same or different sections of tag memory 1030.

To authenticate tag 1020 (and by association, the item attached to tag 1020), an entity may attempt to authenticate AC 1036. For example, a retailer may authenticate AC 1036 in order to determine that a received tag or item is authentic, as described above in step 920. An EAS gate may authenticate AC 1036 to determine whether a tagged item is authorized to leave a facility, as described above in step 940. A returns department may authenticate AC 1036 to determine whether a returned tagged item is authentic, as described above in step 960. In some embodiments, ID 1032 and OC 1035 may be write-locked or permanently write-locked and thereby rendered unchangeable. According to some embodiments, AC 1036 may be unlocked or permanently unlocked to facilitate erasure or overwriting for returned items, as described above in step 960.

Figure 11:
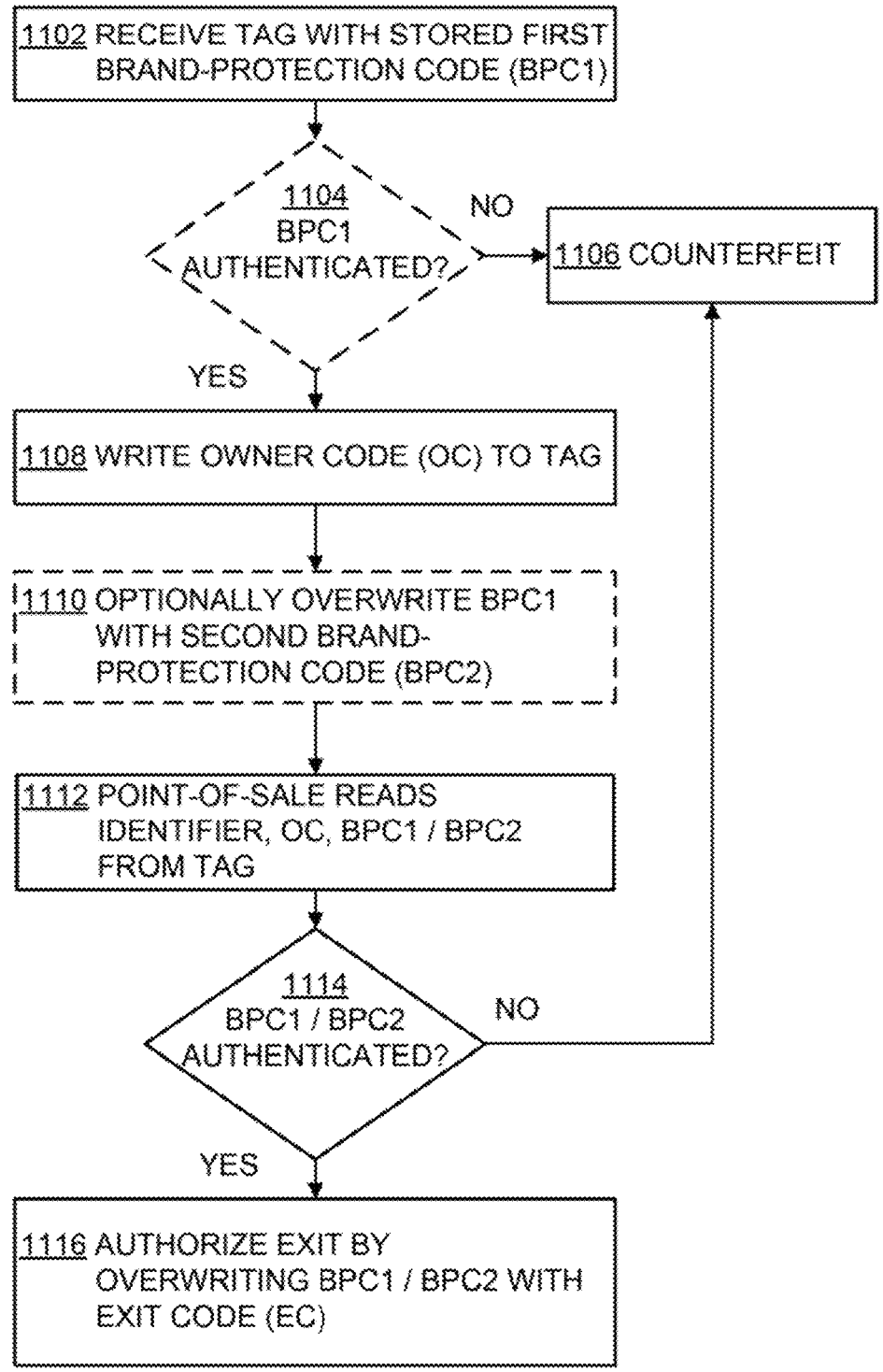
FIG. 11 is a flowchart illustrating a process for maintaining an item authenticity chain during a checkout process according to embodiments.

FIG. 11 is a flowchart illustrating a process 1100) for maintaining an item authenticity chain during a checkout process according to embodiments. At step 1102, a recipient (for example, a retailer, store, or facility) may receive a tag with a stored first brand-protection code BPC1. The tag may be associated with or attached to an item, and BPC1 may be generated based on one or more identifiers associated with the tag and/or the item. In some embodiments, BPC1 may be an electronic signature generated based on tag/item identifiers and optionally other suitable data (e.g., timestamps, location identifiers, certifying data, etc.) using a manufacturer secret or private key, as described above.

At optional step 1104, the recipient may determine whether BPC1 is authentic. If BPC1 is an electronic signature, the recipient may have access to the secret key used to generate BPC1 or the public key corresponding to the private key used to generate BPC1, and may use the key to authenticate BPC1. In some embodiments, the recipient may have access to a database that stores authentic BPCs, and may be able to determine whether BPC1 exists in the database and is associated with the correct tag/item identifiers. If the recipient is unable to authenticate BPC1, then at step 1106 the recipient may deem the tag and/or associated item counterfeit. In some embodiments, the recipient may then initiate an alert or security procedure, as described above.

On the other hand, if at optional step 1104 the recipient determines that BPC1 is authentic, or if optional step 1104 is omitted, at step 1108 the recipient may write an owner code (OC) to the tag. The OC indicates that the recipient owns the tag (and the tagged item), as described above. At optional step 1110, if BPC1 was previously authenticated in optional step 1104 the recipient may overwrite at least a portion of BPC1 with a second brand-protection code BPC2. BPC2, similar to BPC2 in step 920 of FIG. 9, may be generated by the recipient based on a recipient key, an identifier associated with the tag, and/or any other suitable information, and may serve as a second link in an authenticity chain of the tag and/or tagged item, with BPC1 serving as the first link.

At step 1112, a point-of-sale (POS) may read one or more identifiers, the OC, and BPC1 or BPC2 from the tag. For example, a customer may wish to purchase the tagged item, and may use a POS device and/or bring the tagged item to a POS for checkout. The POS, along with determining whether the tagged item should be sold (e.g., by authenticating the OC to ensure that the tagged item belongs to the correct facility and verifying payment information if necessary), may determine whether the BPC on the tag (BPC1 or BPC2) is authentic at step 1114. The POS may assess the authenticity of BPC1/BPC2 using the same techniques described above in relation to step 1104 (i.e., attempting to cryptographically authenticate the BPC and/or looking up the BPC in a database). If the POS is unable to authenticate the BPC, then it may deem the tag or tagged item counterfeit at step 1106, and may interrupt the checkout process and/or initiate an alert or security procedure, such as those described above in relation to step 940 in FIG. 9.

On the other hand, if the POS authenticates the tag, then at step 1116 the POS may authorize the tag and tagged item to exit (assuming that any necessary payment information has also been verified) by overwriting at least a portion of the BPC on the tag with an exit code (EC) that indicates that the tagged item has been sold. In some embodiments, the EC may be generated based on a tag or item identifier, BPC1, BPC2, and/or any other suitable data, using a key associated with the recipient or the POS, as described above in step 930 of FIG. 9. The EC may serve as a second (if BPC2 was not present) or third (if BPC2 was present) link in the authenticity chain of the tag and/or tagged item.

Figure 12:
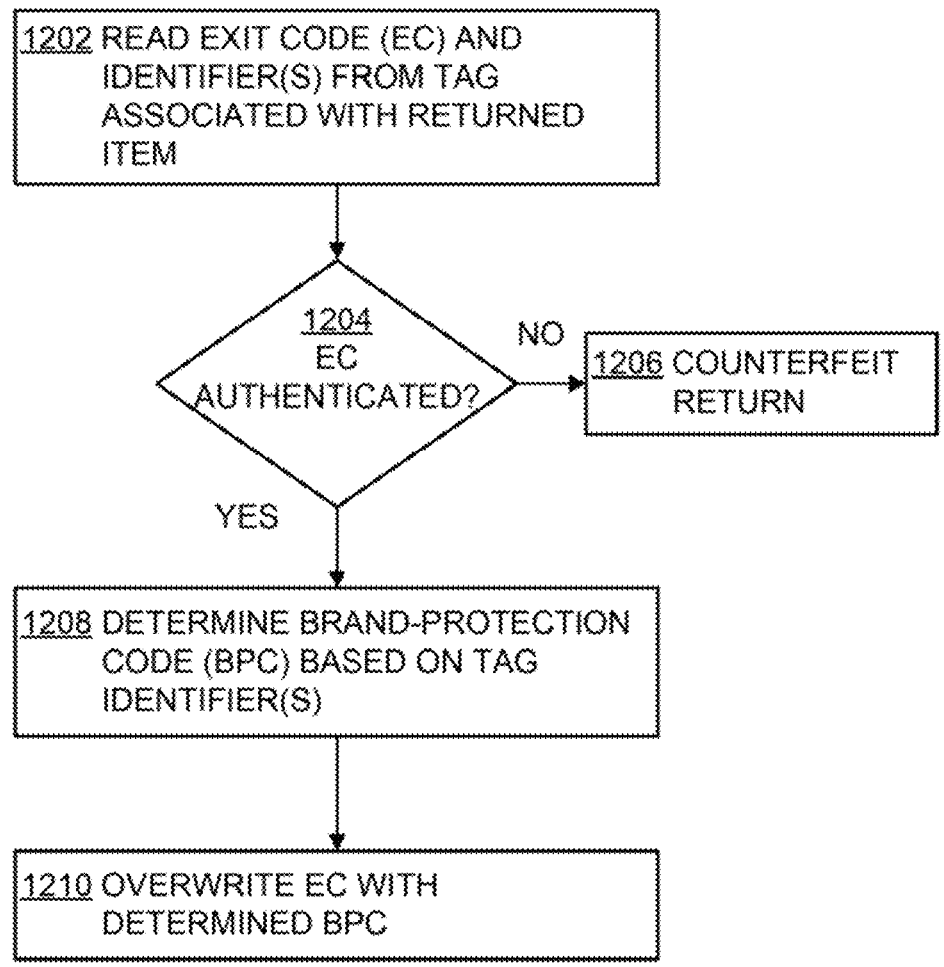
FIG. 12 is a flowchart illustrating a process for maintaining an item authenticity chain during return according to embodiments.

FIG. 12 is a flowchart illustrating a process 1200) for maintaining an item authenticity chain during a return process according to embodiments. At step 1202, a recipient (e.g., the returns desk or department of a store) may receive a returned tagged item and may attempt to read an exit code EC and one or more identifiers from the associated tag. At step 1204, the recipient may determine whether the EC is present and authentic. For example, the recipient may attempt to authenticate the EC using a known key, or may attempt to look up the EC in a database. If the recipient cannot authenticate the EC, or if an EC is not present on the tag, then at step 1206 the recipient may consider the return a counterfeit, and may not process the return and/or may initiate an alert or security procedure, as described above.

On the other hand, if at step 1204 the recipient is able to authenticate the EC, then at step 1208 the recipient may determine a brand-protection code BPC based on the identifier(s) read from the tag, as described above in step 960 of FIG. 9. In some embodiments, the recipient may itself generate the BPC from the identifiers and optionally other suitable data using a particular key. In other embodiments, the recipient may request an appropriate BPC from another entity, or may look up an appropriate BPC from a database. At step 1210, the recipient may then overwrite at least a portion of the EC with the determined BPC, as described above.

The operations described in processes 1100 and 1200 are for illustrative purposes only. These operations may be implemented using additional or fewer operations and in different orders using the principles described herein.

In the above description, a tag/item authenticity chain is described as including one or more BPCs, each generated upon the authentication of a previous BPC and optionally at least partially overwriting the previous BPC. In some embodiments, an OC may be used as a link in an authenticity chain. For example, step 920 of FIG. 9 describes a retailer writing the OC to the tag in response to authenticating BPC1. In addition, an OC such as OC 1035 in FIG. 10 may be permanently write-locked and thereby rendered unchangeable. In this situation, the presence of the OC may attest to the authenticity of the tag or item. Subsequent links of the authenticity chain (e.g., other BPCs) may be stored in other memory locations (e.g., the location of BPC1 in FIG. 9 or AC 1036 in FIG. 10), because the OC may be permanently write-locked and unchangeable.

While the above description is provided in the context of a retailer or retail facility, tag/item authenticity chains as described herein may be used for any suitable application. For example, authenticity chains as described herein may be applied to healthcare, law enforcement, military, food supply and safety, scientific and laboratory, manufacturing, construction, or any other suitable application.

Brand-protection, exit, and other authentication codes are described in some contexts above as being generated, determined, and authenticated based on a cryptographic key, such as a secret key or a private key. In some embodiments, such authentication codes may also or instead be based on one or more secrets. A secret may be a cryptographic key, or may be some other data value known to one or more entities and used to generate authentication codes without using a cryptographic algorithm. For example, a secret may be a randomly-generated value or predetermined value (for example, a cover code) used to mask one or more other data values to generate or determine an authentication code. Such masking may involve the use of one or more non-cryptographic algorithms or techniques, such as bitwise operations (e.g., bitwise exclusive-OR, addition, or similar), arithmetic operations (e.g., arithmetic addition, multiplication, etc.), bit-shifting operations, or similar. Another entity may then be able to authenticate such an authentication code by using knowledge of the secret and the technique used to generate the authentication code.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The invention claimed is:

1. A method for maintaining an authenticity chain for an item approved to exit a facility, the method comprising:
   reading a first identifier from an RFID tag attached to the item;
   reading a first brand-protection code from the RFID tag, the first brand-protection code based on at least the first identifier;
   authenticating the first brand-protection code;

generating an exit code based on at least a second identifier;

subsequent to authenticating the first brand-protection code, overwriting at least a portion of the first brand-protection code on the tag with the exit code; and authenticating the exit code at an exit of the facility.

2. The method of claim 1, wherein the facility is a store and the exit code indicates the item is sold.

3. The method of claim 1, further comprising, upon the item being subsequently returned to the facility:

reading the second identifier and the exit code from the tag;

re-authenticating the exit code;

determining a second brand-protection code based on at least one of the first and second identifiers; and subsequent to re-authenticating the exit code, overwriting at least a portion of the exit code on the tag with the second brand-protection code.

4. The method of claim 3, wherein determining the second brand-protection code comprises one of:

generating the second brand-protection code; and retrieving the second brand-protection code from a database.

5. The method of claim 3, wherein at least one of the actions of generating, determining, or authenticating include generating, determining, or authenticating using at least one secret.

6. The method of claim 3, wherein at least one of:

the first and second identifiers are the same identifier;

the first identifier is one of an Electronic Product Code, an Item Identifier, a trade identification number, and a tag identifier; and the first and second brand-protection codes are the same code.

7. The method of claim 1, further comprising providing an alert in response to failure to authenticate at least one of the first brand-protection code and the exit code.

8. The method of claim 1, further comprising, in response to authenticating the first brand-protection code, writing a store code to the tag.

9. A system for maintaining an authenticity chain for an item approved to exit a facility, the system comprising:

a first RFID reader system configured to:

read a first identifier from an RFID tag attached to the item;

read a brand-protection code from the RFID tag, the first brand-protection code based on at least the first identifier and a first secret;

authenticate the brand-protection code;

determine an exit code, the exit code based on at least a second identifier and a second secret; and subsequent to authentication of the brand-protection code, overwrite at least a portion of the brand-protection code on the tag with the exit code; and a second RFID reader system configured to authenticate the exit code at an exit of the facility.

10. The system of claim 9, wherein the facility is a store and the exit code indicates the item is sold.

11. The system of claim 9, wherein:

the first and second identifiers are the same identifier;

the first identifier is one of an Electronic Product Code, an Item Identifier, a trade identification number, and a tag identifier; and the first secret and the second secret are the same secret.

12. The system of claim 9, wherein at least one of the first and second RFID reader systems are configured to provide an alert if at least one of the brand-protection code and the exit code fail their respective authentications.

13. The system of claim 9, wherein at least one of:

the first RFID reader system is configured to authenticate the brand-protection code by determining whether the brand-protection code is stored in a first database; and the second RFID reader system is configured to authenticate the exit code by determining whether the exit code is stored in a second database.

14. The system of claim 9, wherein the first RFID reader system is configured to write a store code to the tag in response to authentication of the brand-protection code.

15. A Radio Frequency Identification (RFID) reader system comprising:

at least one transceiver configured to transmit and receive RFID signals; and a processor block configured to:

read, via the at least one transceiver, a first identifier from an RFID tag associated with an item;

read, via the at least one transceiver, a first authentication code from the RFID tag, the brand-protection code associated with the item and generated based on at least the first identifier and a first secret;

authenticate the first authentication code;

determine a second authentication code, the second authentication code based on at least a second identifier and a second secret; and overwrite at least a portion of the first authentication code on the tag with the second authentication code after authenticating the first authentication code.

16. The reader system of claim 15, wherein the first authentication code is one of:

a brand-protection code; and an exit code indicating that the item has been sold.

17. The reader system of claim 15, wherein:

the first and second identifiers are the same identifier;

the first identifier is one of an Electronic Product Code, an Item Identifier, a trade identification number, and a tag identifier; and the first secret and the second secret are the same secret.

18. The reader system of claim 15, wherein the processor block is further configured to indicate an alert in response to failure to authenticate the first authentication code.

19. The reader system of claim 15, wherein the processor block is configured to authenticate the first authentication code by determining whether the first authentication code is stored in a database.

20. The reader system of claim 15, wherein the processor block is configured to write a store code to the tag in response to authentication of the first authentication code.

* * * * *

UNITED STATES PATENT AND TRADEMARK OFFICE
CERTIFICATE OF CORRECTION

PATENT NO.        : 9,607,286 B1
APPLICATION NO.   : 14/997602
DATED             : March 28, 2017
INVENTOR(S)       : Christopher J. Diorio It is certified that error appears in the above-identified patent and that said Letters Patent is hereby corrected as shown below:

In the Specification

In Column 3, Line 39, Delete "GSI" and insert -- GS1 --, therefor.
In Column 4, Line 42, Delete "signals)" and insert -- signals). --, therefor.
In Column 7, Line 16 (Approx.), Delete "signal-muting" and insert -- signal-routing --, therefor.
In Column 8, Line 49, Delete "R-T" and insert -- R→T --, therefor.
In Column 8, Line 50, Delete "R-9T" and insert -- R→T --, therefor.
In Column 16, Line 29, Delete "BPC11," and insert -- BPC1, --, therefor.
In Column 16, Line 31, Delete "BPC" and insert -- BPC1 --, therefor.
In Column 19, Line 6, Delete "1100)" and insert -- 1100 --, therefor.
In Column 20, Line 9, Delete "1200)" and insert -- 1200 --, therefor.
In Column 21, Line 32, Delete "and or" and insert -- and/or --, therefor.

Signed and Sealed this
Eighth Day of May, 2018

Andrei Iancu
*Director of the United States Patent and Trademark Office*